Nov. 9, 1948.                    F. H. FLEISCHER                    2,453,504
                    DYNAMOELECTRIC MACHINE AND SECURING DEVICE
                              Filed Nov. 27, 1945

Inventor:
Frank H. Fleischer,
by Prowell F. Mack
   His Attorney.

Patented Nov. 9, 1948

2,453,504

UNITED STATES PATENT OFFICE 2,453,504

DYNAMOELECTRIC MACHINE AND SECURING DEVICE

Frank H. Fleischer, Fort Wayne, Ind., assignor to General Electric Company, a corporation of New York Application November 27, 1945, Serial No. 631,168

7 Claims. (Cl. 171—252)

My invention relates to securing devices and to dynamoelectric machine constructions provided with my improved securing device.

An object of my invention is to provide an improved and simplified member for a dynamoelectric machine.

Another object of my invention is to provide an improved stationary member having a laminated core with a simplified construction for retaining the core in position in a supporting frame.

A further object of my invention is to provide an improved securing or mounting device.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
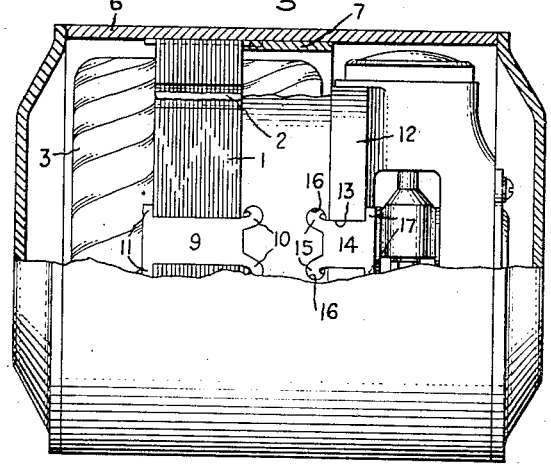
Figure 2:
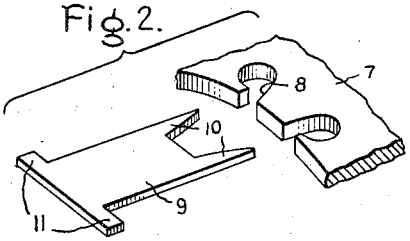
Figure 3:
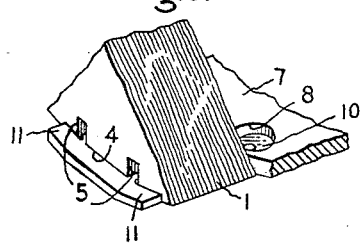
Figure 4:
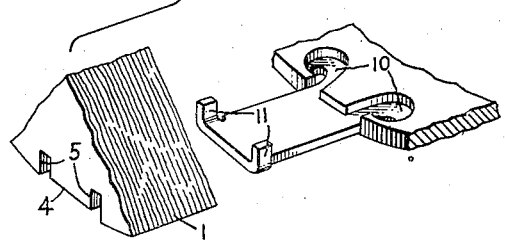
Figure 5:
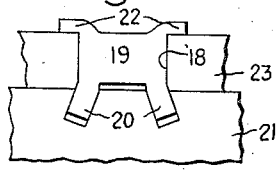
Figure 6:
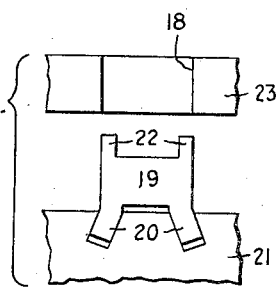
Figure 7:
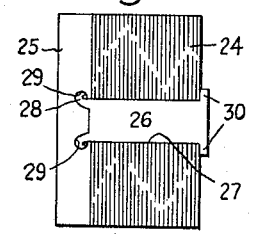
Figure 8:
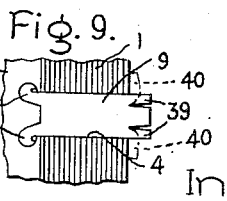
Figures 9, 10:
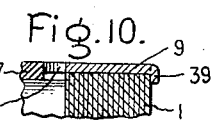

In the drawing, Fig. 1 is a side elevational view, partly broken away, showing a dynamoelectric machine and a compressor driven thereby mounted in a stationary frame member and incorporating an embodiment of my invention; Fig. 2 is an exploded perspective view of an embodiment of my improved securing device and a part of a stationary retaining ring adapted to cooperate with the securing device; Fig. 3 is a partial sectional perspective view of the stationary member of a dynamoelectric machine mounted by a securing device of my improved construction; Fig. 4 is a partial sectional exploded perspective view of the construction shown in Fig. 3 illustrating a method of removing the stationary mounted member from the securing device; Fig. 5 is a plan view showing another embodiment of my invention provided with another construction of a securing device for retaining a stationary member of a machine on a mounting ring; Fig. 6 is an exploded view of the construction shown in Fig. 5 illustrating the method of removing the supported member from the securing device; Fig. 7 illustrates a variation of the construction shown in Figs. 1 and 2; Fig. 8 is a plan view, partly broken away of further embodiment of my invention illustrating an arrangement of securing devices for mounting the stationary core of a dynamoelectric machine on a supporting ring; Fig. 9 is a plan view of a still further embodiment of my improved securing device; and Fig. 10 is an end sectional view of an arrangement of the securing device shown in Fig. 9.

Referring to the drawing, I have illustrated an embodiment of my invention in Figs. 1, 2, 3, and 4 in connection with a dynamoelectric machine and a compressor adapted to be driven by the dynamoelectric machine. The stationary member of the dynamoelectric machine is formed with a core including a plurality of laminations 1 of magnetic material which are secured in assembled relationship in any suitable way as by a weld 2 extending over the outer periphery thereof and which is adapted to be magnetically excited by a winding 3. Each of the laminations 1 is formed with a plurality of circumferentially spaced apart notches or grooves 4 in the outer periphery thereof which are assembled to provide longitudinally extending grooves over the outer periphery of the core of the machine. In addition, relatively narrow slots or additional grooves 5 are formed on each edge of the main groove 4 and also extend longitudinally over the outer periphery of the core to provide a substantially U-shaped groove when the core 1 is assembled in a stationary mounting frame or shell 6 which is adapted to support both the dynamoelectric machine and the compressor shown in Fig. 1. In this construction, a supporting ring 7 is arranged within the outer frame 6 and is formed with a plurality of pairs of angularly extending curved openings 8 in one edge thereof corresponding in number to the number of grooves 4 in the laminated stator core 1. When the dynamoelectric machine is arranged within the frame 6, one edge of the core 1 is arranged in engagement with the edge of the supporting ring 7 in which the openings 8 are formed, such that this ring abuts against the outer surface of the core adjacent the outer periphery thereof with the outer ends of the openings 8 in alignment with the outer sides of the groove 4 in the core 1, and the core is secured in position within the frame 6 by a plurality of securing devices having central shank portions 9 arranged within the grooves 4 of the core 1. In securing the core in position, these securing devices are pressed into the openings 8 in the supporting rings 7, such that bifurcated ends or fingers 10 on one end thereof are deformed and extend angularly into the openings 8 and form anchors therein, as shown in Figs. 3 and 4. The securing device is formed with a pair of transversely extending fingers 11 at the other end thereof which are adapted to be arranged in engagement with the outer surface of the stationary member core for clamping the core in position. In order to remove the core from the frame 6, the fingers 11 of the retaining device may be bent upwardly so that they are deformed to substantially the width of the groove 4 and extend in alignment with the two smaller grooves 5 out of engagement with the outer surface of the core, such that it may be removed from the frame 6 by merely sliding it longitudinally off the retaining devices which may then be removed in any desirable manner from the supporting ring. As a rule, these retaining devices cannot be reused once they have been removed from the supporting ring, as the fingers which project from both ends thereof are apt to be broken, and it is very difficult to provide again the desired clamping fit between the securing devices and the supporting ring and motor core.

As shown in Fig. 1, the compressor is provided with supporting feet 12 in which a plurality of circumferentially spaced apart axially extending grooves 13 are formed through which securing devices similar to those used for securing the stator core in position extend. These securing devices include shanks 14 which extend through the grooves 13 and pairs of deformable fingers 15 at one end thereof which are adapted to be anchored into angularly extending openings 16 formed in the edge of the supporting rings 7 opposite the openings 8. These securing devices are provided with transversely extending fingers 17 which are arranged in engagement with the outer surface of the compressor feet 12 for retaining the stationary member of the compressor in position in the frame. The slots 13 in the feet of the compressor also may be formed with inwardly extending ends similar to the slots 5 in the laminated core 1 to provide for the ready removal of the compressor from the frame 6.

In Figs. 5 and 6, I have shown another embodiment of my invention in which the stationary member which is to be secured is formed with longitudinally extending slots 18 in the outer periphery thereof into which a securing device is adapted to extend which, in this instance, is provided with a shank 19 arranged in the slots 18 and with bifurcated deformable fingers 20 in one end thereof which are adapted to be deformed angularly for anchoring the securing device to a supporting ring 21. The opposite end of the shank 19 is formed with a pair of transversely extending deformable fingers 22 arranged in engagement with the outer surface of the stationary member 23 for securing the entire assembly together. In this construction, the fingers 22 may be bent inwardly so as to be deformed to substantially the width of the grooves 18 by extending longitudinally of the shank 19, as shown in Fig. 6, to provide for the ready removal of the core from the frame supporting ring 21.

In Fig. 7, I have shown another embodiment of my invention in which a laminated core 24 of magnetic material for a dynamoelectric machine is held in assembled relationship and secured to a supporting ring 25 by one of my improved mounting devices which includes a longitudinally extending shank 26 arranged in a longitudinally extending groove 27 formed in the outer periphery of the core 24. This securing device is provided with a bifurcated end having deformable fingers 28 which are pressed into angularly extending curved openings 29 in the edge of the supporting ring 25 adjacent the surface of the laminated core 24, and the other end of the securing device is formed with a pair of transversely extending fingers 30 which engage the outer surface of the core 24 and clamp it in position. In such a construction, the need for additional laminated core assembly retaining means, such as a longitudinally extending weld which is used in a construction similar to that of Fig. 1, is eliminated.

In Fig. 8, I have shown a still further embodiment of my invention in which a laminated core 31 of assembled laminations, which are retained together by a longitudinally extending weld 32 in the same manner as that shown in Fig. 1, is adapted to be secured to a supporting ring 33 by securing devices of my improved construction. In this arrangement, each of the securing devices is provided with a longitudinally extending shank 34 arranged within a longitudinally extending groove 35 formed in the outer periphery of the core 31 and is provided at one end thereof with a deformable finger portion 36 which is pressed into an angularly extending opening 37 formed in the edge of the supporting ring 33 adjacent the outer surface of the core 31. The other end of the securing device is formed with a transversely extending finger 38 arranged in engagement with the outer surface of the core 31 for clamping the core in position to the ring 33. As shown in this figure, adjacent securing devices are arranged in the core with the outer fingers 38 extending in opposite directions, and the supporting ring 33 is formed with adjacent angularly extending openings 37 also extending in opposite directions to assure against displacement or loosening of the stationary member from the supporting ring 33 by turning this member in a direction away from the angularly extending openings. With the illustrated construction, such a tendency to turn the stationary member 31 in either direction merely secures it more firmly in position.

In Figs. 9 and 10, I have shown another embodiment of my invention in which securing devices are formed with a central shank portion 9 adapted to extend through a groove 4 in the outer peripheral surface of a member such as the laminated core 1 and is formed as in the construction shown in Figs. 1 to 4, inclusive, with pronged fingers 10 on a bifurcated end of the shank 9, and these prongs or fingers 10 are driven into the mounting ring 7 so that the ends of the prongs become curved and anchored in position on the mounting ring. As shown, these ends curve outwardly, although an inwardly curved construction could be used equally well for this purpose. In this construction, the end of the shank opposite the fingers 10 may originally be formed with slots 39 or these may be cut into this end of the shank 9, and the outer portions are then bent outwardly as shown in dotted lines at 40 into firm engagement with the outer surface of the member 1 which is mounted on the mounting ring 7, thus securely holding the assembly in position. If desired, however, these ends 39 or the entire end of the shank 9 which projects beyond the outer surface of the member 1 may be bent into engagement with the outer surface of the member 1 as shown in Fig. 10, and thus, securely mount this element in position. Both of these arrangements provide for a secure mounting of the member to be held in position and allow for slight variations in the dimensions of the finished product.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine stationary member including a laminated core of magnetic material with a plurality of longitudinally extending grooves in the outer periphery thereof, a frame around said core having a supporting ring having a plurality of pairs of outwardly curved angularly extending openings in a side thereof adjacent said core corresponding to said plurality of grooves and arranged in engagement with one side of said core, and means including retaining devices arranged in said grooves and each having a bifurcated end mechanically anchored in said ring openings with transversely extending fingers at the other end thereof arranged in engagement with a surface of said core for retaining said core in said frame.

2. A dynamoelectric machine stationary member including a laminated core of magnetic material with a plurality of longitudinally extending grooves in the outer periphery thereof, a frame around said core having a supporting ring having a plurality of pairs of outwardly curved angularly extending openings in a side thereof adjacent said core corresponding to said plurality of grooves and arranged in engagement with one side of said core, and means including retaining devices arranged in said grooves and having a deformable finger at one end mechanically anchored in said ring openings with a transversely extending finger at the other end thereof arranged in engagement with a surface of said core for retaining said core in said frame.

3. A dynamoelectric machine stationary member comprising a laminated core of magnetic material with a plurality of longitudinally extending grooves in the outer periphery thereof, a frame around said core having a supporting ring with a plurality of openings in one side extending angularly to the axis thereof and being arranged in engagement with one side of said core adjacent the outer periphery thereof, and a plurality of retaining devices each having a central shank portion arranged in said core grooves and each having a pair of deformable fingers on one end of said shank extending angularly into said openings in said supporting ring for securing said retaining device in position, each of said retaining devices having transversely extending fingers at the other end of said shanks engaging the outer surface of said core for retaining said core in position in said frame and adapted to be deformed to extend longitudinally of said shank to provide for removal of said core from said frame.

4. A dynamoelectric machine stationary member comprising a laminated core of magnetic material, a frame around said core having a supporting ring with a plurality of openings in one side extending angularly to the axis thereof and being arranged in engagement with one side of said core, and a plurality of retaining devices each having a central shank portion arranged over the outer periphery of said core and each having a pair of deformable fingers on one end of said shank extending angularly into said openings in said supporting ring for securing said retaining device in position, each of said retaining devices having transversely extending fingers at the other end of said shanks engaging the outer surface of said core for retaining said core in position in said frame and adapted to be deformed to substantially the width of said shank and out of engagement with said core outer surface to provide for removal of said core from said frame.

5. A dynamoelectric machine stationary member comprising a laminated core of magnetic material with a plurality of longitudinally extending grooves in the outer periphery thereof, a frame around said core having a supporting ring with a plurality of openings in one side extending angularly to the axis thereof and being arranged in engagement with one side of said core, and a plurality of retaining devices each having a central shank portion arranged in said core grooves and each having a pair of deformable fingers on one end of said shank extending angularly into said openings in said supporting ring for securing said retaining device in position, each of said retaining devices having transversely extending fingers at the other end of said shanks engaging the outer surface of said core for retaining said core in position in said frame and adapted to be deformed to substantially the width of said grooves to provide for removal of said core from said frame.

6. A machine stationary member with a plurality of longitudinally extending grooves in the outer periphery thereof, a frame around said stationary member having a supporting ring with a plurality of openings in one side extending angularly to the axis thereof and being arranged in engagement with one side of said stationary member, and a plurality of retaining devices each having a central shank portion arranged in said stationary member and each having a pair of deformable fingers on one end of said shank extending angularly into said openings in said supporting ring for securing said retaining device in position, each of said retaining devices having transversely extending fingers at the other end of said shanks engaging the outer surface of said stationary member for retaining said stationary member in position in said frame and adapted to be deformed to substantially the width of said grooves to provide for removal of said stationary member from said frame.

7. A machine stationary member with a plurality of longitudinally extending grooves in the outer periphery thereof, a frame around said stationary member having a supporting ring with a plurality of openings in one side extending angularly to the axis thereof and being arranged in engagement with one side of said stationary member, and a plurality of retaining devices each having a central shank portion arranged in said stationary member and each having a deformable finger on one end of said shank extending angularly into said openings in said supporting ring for securing said retaining device in position, each of said retaining devices having a transversely extending finger at the other end of said shank engaging the outer surface of said stationary member for retaining said stationary member in position in said frame and adapted to be deformed to substantially the width of said grooves to provide for removal of said stationary member from said frame.

FRANK H. FLEISCHER.

REFERENCES CITED

The following references are of record in the file of this patent:

UNITED STATES PATENTS

| Number | Name | Date |
|---|---|---|
| 450,811 | Junquera | Apr. 21, 1891 |
| 559,276 | Fox | Apr. 28, 1896 |
| 747,219 | Preslar | Dec. 15, 1903 |
| 733,669 | Merrill | July 14, 1903 |
| 849,663 | Curtis | Apr. 9, 1907 |
| 886,515 | Jude | May 5, 1908 |
| 1,119,686 | Davis | Dec. 1, 1914 |
| 1,248,655 | Hennessy | Dec. 4, 1917 |
| 1,670,398 | Abreu | May 22, 1928 |
| 1,871,481 | Trimbach | Aug. 16, 1932 |
| 2,206,554 | Snell | July 2, 1940 |
| 2,290,311 | Belanger | July 21, 1942 |